United States Patent Office 3,328,320
Patented June 27, 1967

---

3,328,320
MANUFACTURE OF FLEXIBLE POLYURETHANE FOAMS UTILIZING POLYETHER-POLYISOCYANATE DISPERSION
Frank Whitley Lord, Manchester, England, assignor to Imperial Chemical Industries Limited, London, England, a corporation of Great Britain
No Drawing. Filed Feb. 20, 1964, Ser. No. 346,100
Claims priority, application Great Britain, Feb. 25, 1963, 7,506/63
4 Claims. (Cl. 260—2.5)

This invention relates to improvements in or relating to the manufacture of polymeric materials, more particularly foamed polyurethanes from organic polyisocyanates and hydroxyl group-containing polyethers.

It has already been proposed to manufacture foamed polyurethanes by the interaction of hydroxyl group-containing polyethers with organic polyisocyanates in the presence of gas-generating agents such as water and low boiling-point liquids which are inert with respect to the polyurethane foam-forming ingredients. In particular it is known from British Patent No. 874,430 to use organic polyisocyanate compositions which comprise a major proportion of a diarylmethane diisocyanate and at least 5% by weight of a polyisocyanate of functionality greater than two. These polyisocyanate compositions possess a number of advantages over the simpler diisocyanates such as tolyene diisocyanate, of which there may be mentioned the greater ease of one-step foam formation and the lower toxic hazard which results from their low vapour pressures. Polyisocyanate compositions of this type are, however, immiscible with hydroxyl group-containing polyethers and the success of foam formation is influenced by the stability of the dispersions formed during the mixing operation. No difficulty has been experienced in rigid foam manufactured where the hydroxyl content of the polyether is so high that the amount of polyisocyanate composition required to react with the polyether and any water present exceeds in weight the amount of polyether used. But in the manufacture of foams from polyethers having lower hydroxyl values such that the weight of polyisocyanate composition required for the reaction is less than the weight of polyether employed, difficulty has been experienced in preparing uniformly foamed products. In addition to showing signs of incomplete combination of the various ingredients of the system, the mechanical properties of these foams have not been entirely satisfactory, presumably because of the incompleteness of the reactions which take place between the incompletely homogenised ingredients.

It has now been found that these difficulties may be obviated or minimised by first mixing the diarylmethane diisocyanate composition with an amount of the polyether such that the weight ratio of polyisocyanate composition to polyether is at least equal to 1, thus forming a dispersion of polyether in polyisocyanate and thereafter mixing the dispersion with the gas-generating agent and remaining quantity of polyether and allowing the mixture to react forming a foam. The foams obtained by this means are of uniform texture and have physical properties superior to those of foams made from the same polyisocyanates and polyethers by prior art methods.

Thus according to the present invention there is provided an improved process for the production of foamed polyurethane materials by the interaction of an organic polyisocyanate composition comprising a major proportion of a diarylmethane diisocyanate and at least 5% by weight of a polyisocyanate of functionality greater than two with a hydroxyl group-containing polyether in the presence of a gas-generating agent such as water or a low boiling point liquid which is inert with respect to the polyurethane foam-forming ingredients, the combined active hydrogen content of the polyether and any water present being such that the weight of polyisocyanate composition required for the interaction is less than the weight of polyether used, said process comprising the steps of mixing the polyisocyanate composition with an amount of the polyether such that the weight ratio of polyisocyanate composition to polyether is at least equal to 1 thus forming a dispersion of polyether in the polyisocyanate composition and thereafter mixing the dispersion with the gas-generating agent and the remaining quantity of polyether and allowing the mixture to react forming a foam.

Especially suitable diarylmethane diisocyanates are diphenylmethane diisocyanate and phenyltolylmethane diisocyanate. Other diarylmethane diisocyanates which may be used in the process of the present invention include mono- and di-alkyl diphenylmethane diisocyanates such as the ethyl derivatives, mono- and dichlorodiphenylmethane diisocyanates, and mono- and dialkoxy diphenylmethane diisocyanates such as the methoxy derivatives. The diarylmethane diisocyanates may be made, for example, by phosgenating the corresponding diamines or the polyamine compositions obtained by condensing formaldehyde with aromatic amines or mixtures thereof.

The content of polyisocyanate of functionality greater than two may be introduced into the polyisocyanate composition in many different ways, for example as follows:

(1) A polyisocyanate containing more than two isocyanate groups may be added directly to the diarylmethane diisocyanate; thus for example there may be added toluene-2:4:6-triisocyanate, benzene-1:3:5 - triisocyanate, diphenylmethane-2:4:4'-triisocyanate, 2:4:4' - triisocyanatodiphenyl, 2:4:4' - triisocyanatodiphenylether, and the like.

(2) Some of the diarylmethane diisocyanate may be interacted wtih a polyhydric alcohol, thereby forming a polyisocyanate containing three or more isocyanate groups per molecule; thus for example it may be interacted with trimethylolpropane, glycerol, hexanetriol or pentaerythritol.

(3) The diarylmethane diisocyanate may be partially polymerised to form isocyanurate derivatives. Such polymerisation of the diarylmethane diisocyanate may be achieved by the action of catalysts for example alkali metal salts of weak acids, alkali metal oxides or hydroxides, or soluble metal salts such as lead 2-ethyl hexoate or zinc naphthenate.

(4) During the manufacture of the diarylmethane diisocyanate by phosgenation of crude diaminodiarylmethane, triamines and other polyamines are also phosgenated and give rise to polyisocyanates of functionality greater than two. Likewise during the phosgenation process polymerisation of the diisocyanate may occur. The method whereby the polyisocyanate of functionality greater than two is introduced into the polyisocyanate composition is not critical, provided that the content thereof is between 5% and 50%, and preferably between 15% and 40% by weight of the composition. It is preferred that the carbamyl chloride content of the polyisocyanate composition, which may be introduced during the phosgenation process, should lie between such limits that the measured ionisable chlorine content is from 0.01% to 3.0% by weight.

Particularly preferred are the organic polyisocyanate compositions prepared by phosgenating the polyamine compositions obtained by reacting formaldehyde with aniline or with mixtures of aniline and o-toluidine.

The amount of polyisocyanate composition required and used for the interaction is normally an amount that is approximately stoichiometrically equivalent to the active hydrogen-containing materials, i.e. polyether, and water if present, which are employed in the interaction. It is well-known that the physical properties of polyurethane foams may be modified by using slightly less or slightly more than the exact stoichiometric amount, for example a 10% deficiency or excess. Thus the amount required will depend to a large extent upon the effect it is desired to achieve, but will not normally differ from the stoichiometric amount by more than about 20%.

Any polyether having at least 2 hydroxyl groups per molecule may be used in the process of the present invention provided that its hydroxyl value is such that the weight of polyisocyanate composition required to react with the polyether and any water present is less than the weight of polyether employed. Such polyethers will normally have hydroxyl values not exceeding 450 mg. KOH/g. Where water is used as the sole gas-generating agent it is only with polyethers of somewhat lower hydroxyl values that the requirement is met that the weight of polyether exceeds the weight of polyisocyanate.

As examples of polyethers for use in the process of the present invention there may be mentioned hydroxyl-ended polymers and copolymers of cyclic oxides, for example 1:2-alkylene oxides such as ethylene oxide, epichlorohydrin, 1:2-propylene oxide, 1:2-butylene oxide, and 2:3-butylene oxide, oxacyclobutane and substituted oxacyclobutanes and tetrahydrofuran. Such polyethers may be linear polyether glycols as are prepared for example by the polymerisation of an alkylene oxide in the presence of a basic catalyst, such as potassium hydroxide and a glycol or a primary monoamine. Alternatively there may be used branched polyethers prepared for example by the polymerisation of an alkylene oxide in the presence of a basic catalyst and a substance having more than two active hydrogen atoms per molecule for example ammonia, hydrazine and polyhydroxy compounds such as glycerol, hexanetriols, trimethylolethane, triethanolamine, pentaerythritol, sorbitol, sucrose and phenol-formaldehyde reaction products, aminoalcohols such as monoethanolamine and diethanolamine and polyamines such as ethylene diamine, tolylene diamine and diaminodiphenylmethane. Branched polyethers may also be produced by copolymerising a cyclic oxide of the type already mentioned with cyclic oxides having a functionality greater than two, for example diepoxides, glycidol and 3-hydroxymethyloxacyclobutane.

The process of the present invention has been found to be particularly suitable for use with propylene oxide polymers and block copolymers of propylene and ethylene oxides containing up to 10% by weight of oxyethylene residues especially those having hydroxyl values in the range of from 20 to 60 mg. KOH/g. Such polyethers are of considerable interest for the production of high modulus, low resilience foams suitable for crash-padding in motor vehicles. It is important that such foams should be of uniform texture which is not always the case when prior art methods of foaming are employed.

The amount of hydroxyl group-containing polyether which is mixed with the polyisocyanate composition in order to form a dispersion of polyether in the polyisocyanate composition may be any amount provided that the weight ratio of polyisocyanate composition to polyether is at least equal to 1. For preference this ratio should be between 1 and 20. Any suitable means may be employed for mixing the polyether and the polyisocyanate composition although extremely high mixing speeds should be avoided since the stability of the dispersion may be affected adversely. Although the dispersion obtained is relatively stable it is normally mixed with the remaining quantity of polyether and the other ingredients of the system before a substantial degree of reaction has taken place between the polyether and the polyisocyanate composition. For this mixing stage there may be used any mixing apparatus such as has been described, for example in the prior art relating to the production of polyurethane foams. The whole process may be carried out discontinuously or, by employing two suitably arranged mixing zones, a continuous process may be used.

When water is employed as a gas generating agent it is normally employed in an amount of up to 7% by weight based on the weight of polyether employed in the reaction. In any particular formulation, of course, the amount of water and the hydroxyl value of the polyether will be such that the weight of polyether used exceeds the weight of polyisocyanate composition required.

Instead of or in addition to water there may be employed as a gas-generating agent a low boiling-point liquid which is inert with respect to the polyurethane foam-forming ingredients and which will vaporize during the exothermic polyurethane-forming reaction.

Suitable low boiling-point liquids that are inert towards the polyurethane foam-forming ingredients are those having boiling points not exceeding 75° C. at atmospheric pressure, preferably between —40° C. and 50° C. for example halogenated hydrocarbons such as methylene chloride, trichlorofluoromethane, dichlorofluoromethane, dichloromonofluoromethane, monochlorodifluoromethane, dichlorotetrafluoroethane, 1:1:2-trichloro-1:2:2-trifluoroethane, dibromodifluoromethane and monobromotrifluoroethane.

Mixtures of these low boiling-point liquids one with another and/or with other substituted or unsubstituted hydrocarbons may also be used.

Such low boiling-point liquids are usually employed in amounts of from 1% to 100% preferably from 5% to 50% by weight of the hydroxyl group-containing polymer.

As is fully described in the prior art, other ingredients which may be incorporated in the reaction mixture during the manufacture of polyurethane foams include surface active agents. In the process of the present invention it is particularly advantageous for the dispersion of polyether in the polyisocyanate composition to be formed in the presence of a surface-active agent since the stability of the dispersion is thereby improved and the mixing conditions become less critical.

Particularly suitable surface-active agents are siloxane-oxyalkylene block copolymers. If desired, mixtures of siloxane-oxyalkylene block copolymers with other surface active agents such as oxyethylated phenols, oxyethylated fatty alcohols or block copolymers of ethylene and propylene oxides may be used. In order to be present during the formation of the dispersion, the surface-active agent may first be added to the polyisocyanate composition or, preferably, to the polyether which is to be dispersed in the polyisocyanate. The amount of surface-active agent to be used may be from 0.2% to 20% preferably from 1% to 5% by weight of the total amount of hydroxyl group-containing polyether.

If desired there may also be included in the polyurethane foam-forming reaction mixture a catalyst. Suitable catalysts are well-known in the art and include basic compounds such as tertiary amines, for example, triethylamine, dimethylbenzylamine, dimethylcyclohexylamine, dimethylphenylethylamine, tetramethyl - 1:3 - butane-diamine, triethylene diamine, 4-dimethylaminopyridine, N-alkylmorpholines, N-alkylpiperidines and N-alkylpyrrolidines. Examples of other suitable basic catalysts include potassium hydroxide, potassium carbonate, potassium acetate, and basic lead acetate. Other suitable catalysts are non-basic organic compounds of metals such as lead carboxylates, zinc carboxylates, zinc or lead dialkyl-dithiophosphates, acetylacetonates of the transition elements and other metals and tin compounds, for example, dibutyltin dilaurate and stannous octoate. It is particularly advantageous for a catalysts to be present during the formation of the dispersion of the polyether in the polyisocyanate composition since the dispersion is thereby produced with greater ease. For this purpose it is convenient to add the catalyst to the polyether before the latter is mixed with the polyisocyanate. Similar results are obtained by using a polyether from which the basic polymerisation catalyst, for example potassium hydroxide, has not been removed.

Other additives which may be included in the foam-forming mixture include flame retardants such as tris-β-chloroethyl phosphate and antimony oxide, non-polymeric cross-linking agents such as triethanolamine and glycerol, plasticisers such as dialkyl phthalate, colouring matters and antioxidants such as tert-butyl catechol.

The invention is illustrated but not limited by the following examples in which all parts are by weight:

*Example 1*

70 parts of polypropylene glycol having a hydroxyl value of 55 mg. KOH/gm. and an acid value of 0.04 mg. KOH/gm. are well mixed with 0.3 part of stannous octoate and 2.0 parts of a siloxane-oxyalkylene block copolymer. To this mixture is added 78 parts of a crude diphenylmethane-4:4'-diisocyanate composition and the whole is stirred for 20 seconds at 1000 r.p.m. using a flat paddle type agitator. To the resulting dispersion is added with stirring a further 30 parts of the same polyether. Finally, a mixture of 3.5 parts of water and 0.5 part of diazabicyclooctane (triethylene diamine) is incorporated and stirred for a further 10 seconds at 1000 r.p.m. and the mass allowed to react. The resulting foam is of uniform texture and free from particles of undispersed diisocyanate.

The diphenylmethane diisocyanate composition used in this example is prepared by phosgenating a crude diaminodiphenylmethane containing about 15% of polyamines (mainly triamines), obtained by condensing formaldehyde with aniline in the presence of hydrochloric acid.

When the procedure of this example is repeated but mixing the diphenylamine diisocyanate composition with the whole 100 parts of the polyether instead of 70 parts and mixing the siloxane-oxyalkylene block copolymer with the water and amine and then combining the two mixtures, the resulting foam has a speckled appearance due to the poorly dispersed diisocyanate.

*Example 2*

70 parts of an oxypropylated hexanetriol having a hydroxyl value of 28 mg. KOH/gm. and a molecular weight of 6000 are well mixed with 0.3 part of stannous octoate. To this mixture is added 70 parts of a crude diphenylmethane-4:4'-diisocyanate composition and the whole stirred for 20 seconds at 1000 r.p.m. using a flat paddle type agitator. To the resulting dispersion is added with stirring a further 30 parts of the same polyether. Finally a mixture of 3.5 parts of water, 0.5 part of diazabicyclooctane (triethylene diamine) and 1.0 part of a siloxane-oxyalkylene block copolymer is incorporated and stirred for a further 10 seconds at 1000 r.p.m. and the mass allowed to react. The resulting foam is of uniform texture and free from undispersed diisocyanate.

The preparation of the crude diphenylmethane diisocyanate used in this example is described in Example 1.

*Example 3*

70 parts of oxyethylated oxypropylated glycerol having a hydroxyl value of 33.7 mg. KOH/gm., a molecular weight of 5000 and an oxyethylene content of approximately 5% are well mixed with 0.5 part of dibutyltin dilaurate and 1.0 part of a siloxane-oxyalkylene block copolymer. To this mixture is added 72 parts of the diphenylmethane-4:4'-diisocyanate composition described in Example 1 and the whole is stirred for 20 seconds at 1000 r.p.m. using a flat paddle type agitator. To the resulting dispersion is added with stirring a further 30 parts of the polyether.

Finally a mixture of 3.5 parts of water and 0.5 part of diazabicyclooctane (triethylene diamine) is incorporated and stirred for a further 10 seconds at 1000 r.p.m. and the mass allowed to react. The resulting foam is of uniform texture and free from undispersed diisocyanate.

*Example 4*

70 parts of an oxypropylated glycerol having a hydroxyl value of 42.1 mg. KOH/gm. and a molecular weight of 4000 are well mixed with 0.3 part of stannous octoate and 1.0 part of a siloxane-oxyalkylene block copolymer. To this mixture is added 74 parts of a 3-methyldiphenylmethane-4:4'-diisocyanate composition and the whole is stirred for 20 seconds at 1000 r.p.m. using a flat paddle type agitator. To the resulting dispersion is added, with stirring, a further 30 parts of the polyether. Finally a mixture of 3.5 parts of water and 0.5 part of diazabicyclooctane (triethylene diamine) is incorporated and stirred for a further 10 seconds at 1000 r.p.m. and the mass allowed to react. The resulting foam is of uniform texture and free from undispersed diisocyanate.

The 3-methyldiphenylmethane-4:4'-diisocyanate composition used in this example is prepared by phosgenating a crude diamino phenyltolylmethane containing about 15% of polyamines (mainly triamines), obtained by condensing formaldehyde with aniline and o-toluidine in the presence of hydrochloric acid.

What is claimed is:

1. In the process for the production of flexible foamed polyurethane materials by the interaction of an organic polyisocyanate composition comprising a major proportion of a diarylmethane diisocyanate and at least 5% by weight of a polyisocyanate having more than two isocyanate groups per molecule with a hydroxyl terminated polyether containing at least two hydroxyl groups per molecule in the presence of a gas-generating agent selected from the group consisting of water and halogenated hydrocarbons having boiling points not exceeding 75° C. at atmospheric pressure inert will respect to the polyurethane foam-forming ingredients, the improvement being wherein the combined weight of the polyether and any water present being such that the parts by weight of polyisocyanate composition required for the combined parts by interaction is less than the weight of polyether and water used, and the steps of mixing, under non-reaction conditions, all the polyisocyanate composition with an amount of the polyether such that the weight ratio of polyisocyanate composition to polyether is 1 or more whereby forming an unreacted dispersion of polyether in the polyisocyanate composition and thereafter mixing the dispersion with the gas-generating agent and the remaining quantity of polyether and allowing the mixture to react thereby forming a foam.

2. The process of claim 1 wherein the diarylmethane diisocyanate is selected from the group consisting of diphenylmethane diisocyanate and phenyltolylmethane diisocyanate.

3. The process of claim 1 wherein the hydroxyl group-containing polyether is selected from the group consisting of propylene oxide polymers and block copolymers of propylene and ethylene oxides containing up to 10% by weight of oxyethylene residues.

4. The process of claim 1 wherein the dispersion of polyether in the polyisocyanate composition is formed in the presence of a surface active agent.

(References on following page)

References Cited

UNITED STATES PATENTS

| | | | |
|---|---|---|---|
| 2,888,409 | 5/1959 | Bender et al. | 260—2.5 |
| 3,108,975 | 10/1963 | Lambert et al. | 260—2.5 |

FOREIGN PATENTS

| | | |
|---|---|---|
| 221,411 | 5/1958 | Australia. |
| 247,616 | 9/1960 | Australia. |
| 850,664 | 10/1960 | Great Britain. |
| 874,430 | 10/1961 | Great Britain. |

DONALD E. CZAJA, *Primary Examiner.*

LEON J. BERCOVITZ, *Examiner.*

J. J. KLOCKO, G. W. RAUCHFUSS, *Assistant Examiners.*